United States Patent
Shinozaki

(10) Patent No.: US 7,828,384 B2
(45) Date of Patent: Nov. 9, 2010

(54) DEVICE FOR ADJUSTING HEIGHT OF AUTOMOBILE SEAT

(75) Inventor: Katsuhiko Shinozaki, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 15 days.

(21) Appl. No.: 12/301,537

(22) PCT Filed: May 18, 2007

(86) PCT No.: PCT/JP2007/060659

§ 371 (c)(1),
(2), (4) Date: May 29, 2009

(87) PCT Pub. No.: WO2007/136120

PCT Pub. Date: Nov. 29, 2007

(65) Prior Publication Data

US 2010/0001569 A1    Jan. 7, 2010

(30) Foreign Application Priority Data

May 19, 2006    (JP) .............................. 2006-139950

(51) Int. Cl.
*B60N 2/16* (2006.01)
(52) U.S. Cl. .............................. 297/344.15; 297/344.14
(58) Field of Classification Search ............. 297/344.1, 297/344.12, 344.14, 344.15, DIG. 10; 248/564
See application file for complete search history.

(56) References Cited

U.S. PATENT DOCUMENTS 4,556,185 A * 12/1985 Takagi ..................... 248/421
6,290,198 B1 * 9/2001 Kojima et al. ............. 248/422
7,278,686 B2 * 10/2007 Yoshida ..................... 297/338
7,316,454 B2 * 1/2008 Yoshida .................. 297/344.14
7,766,427 B2 * 8/2010 Kojima et al. .......... 297/344.15

FOREIGN PATENT DOCUMENTS

| JP | 10129322 | 5/1998 |
| JP | 2000108734 | 4/2000 |
| JP | 2000127813 | 5/2000 |
| JP | 2001138780 | 5/2001 |
| JP | 20041593 | 1/2004 |
| JP | 200614867 | 1/2006 |
| WO | 2004094180 | 11/2004 |

OTHER PUBLICATIONS

Intl. Appln. No. PCT/JP2007/060659, International Search Report, Jul. 17, 2007.

* cited by examiner

*Primary Examiner*—Joseph F Edell
(74) *Attorney, Agent, or Firm*—Dann, Dorfman, Herrell and Skillman, P.C.

(57) ABSTRACT

A height adjusting device for an automobile seat is disclosed. The height adjusting device includes a sector gear (13) arranged between a side frame section (1) of a seat cushion frame of the seat and a linkage arm (2) and supported to a fixing pin (2a) of the linkage arm (2), a plating pin (16) for interconnecting the linkage arm (2) and a linkage rod (4), the planting pin (16) being provided at the sector gear (13), and a spiral spring (14) stretched between the fixing pin (2a) projected from the linkage arm (2) and the planting pin (16) with an innermost end portion (14a) thereof being retained around an end of the fixing pin (2a), and with an outermost end portion (14b) thereof being retained around an end of the planting pin (16).

2 Claims, 3 Drawing Sheets

DEVICE FOR ADJUSTING HEIGHT OF AUTOMOBILE SEAT

TECHNICAL FIELD

The present invention relates to a height adjusting device for an automobile seat, which allows a height of the seat to be adjusted according to an occupant's physique.

BACKGROUND ART

As an automobile seat, there is proposed an automobile seat which includes a height adjusting device provided between first and second pairs of spaced apart base brackets, mounted on a pair of first and second spaced apart upper rail members of a slide rail mechanism, and a pair of first and second spaced apart side frame sections of a frame for a seat cushion of the seat.

The height adjusting device includes two pairs of forward and rearward linkage arms, the forward linkage arms being bridged between the side frame sections and the first pair of spaced apart brackets, the rearward linkage arms being bridged between the side frame sections and the second pair of spaced apart brackets, a linkage rod connected, via a first support pin, at a rearward end portion thereof to one of the rearward linkage arms which is arranged on the side of the first side frame section, a first connection shaft interconnecting the forward linkage arms, a second connection shaft interconnecting the rearward linkage arms, and an actuating mechanism which includes an operation knob arranged outside the first side frame section of the seat cushion frame and having a rotating shaft rotatably penetrated through the first side frame section, a pinion gear arranged inside the first side frame section and mounted around an end portion of the rotating shaft of the operating knob which is projected inward from the first side frame section, and a sector gear arranged inside the first side frame section and meshed with the pinion gear (Japanese Patent Application Laid-Open No. 2001-138780 and WO2004/094180A1).

In the height adjusting device, the sector gear is supported at a base portion thereof to the first side frame section by a second support pin, and the linkage rod is connected at a forward end portion thereof to the sector gear by a third support pin. When the operation knob is rotated in a counter-clockwise direction or a clockwise direction, the pinion gear and the sector gear are rotated to thereby draw the linkage rod in such a manner to cause the linkage rod to be moved forward or rearward according to the rotation direction of the operation knob. Synchronously with such movement of the linkage rod, the forward and rearward linkage arms are pivoted so as to rise up or pivoted so as to be collapsed according to the rotational direction of the operation knob.

In the actuating mechanism of the height adjusting device, the components of the actuating mechanism are supported or connected by many support pins and the number of the components is thus increased, so that much time is required for assembling of the actuating mechanism, thus resulting in increase of the assembling cost.

As a height adjusting device for an automobile seat, there is known a height adjusting device which is configured so as to lift the automobile seat up with resort to rotational torque exerted by a spiral spring (Japanese Patent Application Laid-Open Nos. 2000-108734 and 2000-127813).

In the actuating mechanism including the pinion gear and the sector gear which have been discussed above, a spiral spring may be also employed. From the viewpoint of operation-load, it is preferable that the spiral spring is provided so as to facilitate rotation of the sector gear. In the installation structure of the sector gear which has been discussed above, the spiral spring may be stretched between the second support pin for causing the sector gear to be supported to the first side frame section, and the third support pin for causing the linkage rod to be connected to the sector gear.

If the spiral spring is stretched between the second and third support pins as discussed above, an innermost end of the spiral spring may be retained around an end portion of the second support pin which is projected inward from the sector gear, but an outermost end portion of the spiral spring is required to be retained around an axial portion of the third support pin, interconnecting the linkage rod and the sector gear, which is located between the linkage rod and the sector gear. Such an arrangement of the spiral spring not only requires a lot of work to assemble a peripheral structure around the sections to which the spiral spring is retained, but also prevents easy replacement of the spiral spring.

The second support pin supporting the sector gear is required to have a large diameter from the viewpoint of rigidity. In addition, there is a limitation on an offset amount between the second support pin of the sector gear and the third support pin of the linkage rod, so that it is impossible to obtain an installation space for a spiral spring of a large spring constant.

DISCLOSURE OF THE INVENTION

It is an object of the present invention to provide a height adjusting device for an automobile seat, which facilitates simplification of a peripheral structure around spring-installing sections for a spiral spring of the height adjusting device, facilitates reduction of time required to assemble the height adjusting device, makes it possible to reduce the assembling cost of the height adjusting device, and makes it possible to easily perform replacement of the spiral spring.

It is another object of the present invention to provide a height adjusting device for an automobile seat, which is provided with a spiral spring of a large spring constant and benefits excellent operability of the height adjusting device.

In accordance with the present invention, there is provided a height adjusting device for an automobile seat. The automobile seat includes a seat cushion frame having a pair of first and second spaced apart side frame sections, and first and second pairs of spaced apart base brackets. The height adjusting device comprises a pair of first and second forward linkage arms, the first forward linkage arm being bridged between the first side frame section and corresponding one of the first pair of spaced apart brackets and supported at a substantially middle portion thereof to the first side frame section by a fixing pin, the second forward linkage arm being bridged between the second side frame section and the other of the first pair of spaced apart brackets and supported at a substantially middle portion thereof to the second side frame section, a pair of first and second rearward linkage arms, the first rearward linkage arm being bridged between the first side frame section and corresponding one of the second pair of spaced apart brackets and supported at a substantially middle portion thereof to the first side frame section, the second rearward linkage arm being bridged between the second side frame section and the other of the second pair of spaced apart brackets and supported at a substantially middle portion thereof to the second side frame section, a first linkage rod connected at a forward end and a rearward end thereof to an upper end of the first forward linkage arm and an upper end of the first rearward linkage arm, a second linkage rod connected at a forward end and a rearward end thereof to an upper end of the second forward linkage arm and an upper end of the second rearward linkage arm, a first connection shaft interconnecting the forward linkage arms, a second connection shaft interconnecting the rearward linkage arms, and an actuating mechanism for causing the forward and rearward linkage arms to be vertically pivoted. The actuating mechanism includes an operation knob having a rotating shaft, the operation knob being arranged outside the first side frame section with the rotating shaft being rotatably penetrated through the first side frame section, a pinion gear mounted around the rotating shaft, a sector gear for directly drawing the first linkage rod, the sector gear being arranged inside the first side frame section and meshed with the pinion gear, and a spiral spring for directly biasing the first forward linkage arm in a rising-up direction, the sector gear being arranged between the first side frame section and the first forward linkage arm and supported at a base portion thereof to the fixing pin of the first forward linkage arm, the sector gear having a planting pin provided at a corner portion thereof adjacent gear teeth thereof so as to be projected from the sector gear, the first forward linkage arm and the first linkage rod being connected to each other by the fixing pin, and the spiral spring being stretched between the fixing pin and the planting pin with an innermost end portion thereof being retained around an end of the fixing pin which is projected inward from the first forward linkage arm, and with an outermost end portion thereof being retained around an end of the planting pin which is projected inward from a connection portion between the first forward linkage arm and the first linkage rod.

In the height adjusting device for the automobile seat, which is constructed as discussed above, the fixing pin which supports the first forward linkage arm is also used as a support pin for supporting the sector gear and the planting pin projecting from the sector gear is used as a connection pin for interconnecting the first forward linkage arm and the first linkage rod, so that a special support pin for supporting the sector gear is not required, and the first forward linkage arm and the first linkage rod are connected to each other by the single support pin. Therefore, the number of components of the height adjusting device is reduced, and reduction in time required to assemble the height adjusting device and reduction in the assembling cost thereof can be realized.

Moreover, the spiral spring is stretched between the fixing pin and the planting pin with the innermost end portion thereof being retained around the end of the fixing pin which is projected inward from the first forward linkage arm, and with the outermost end portion thereof being retained around the end of the planting pin which is projected inward from a connection portion between the first forward linkage arm and the first linkage rod. This arrangement of the spiral spring facilitates simplification of a peripheral structure around the sections to which the spiral spring is applied, and facilitates easy replacement of the spiral spring.

In a preferred embodiment of the present invention, the fixing pin is provided at the end thereof with a spring-retaining member, the spiral spring has a large spring constant, and the innermost end portion of the spiral spring is retained to the spring-retaining member. This embodiment allows the entire seat to be moved vertically by causing the operation knob to be rotated with small power, thus making it possible to improve operability of the height adjusting device.

BEST MODE FOR CARRYING OUT THE INVENTION

Figure 1:
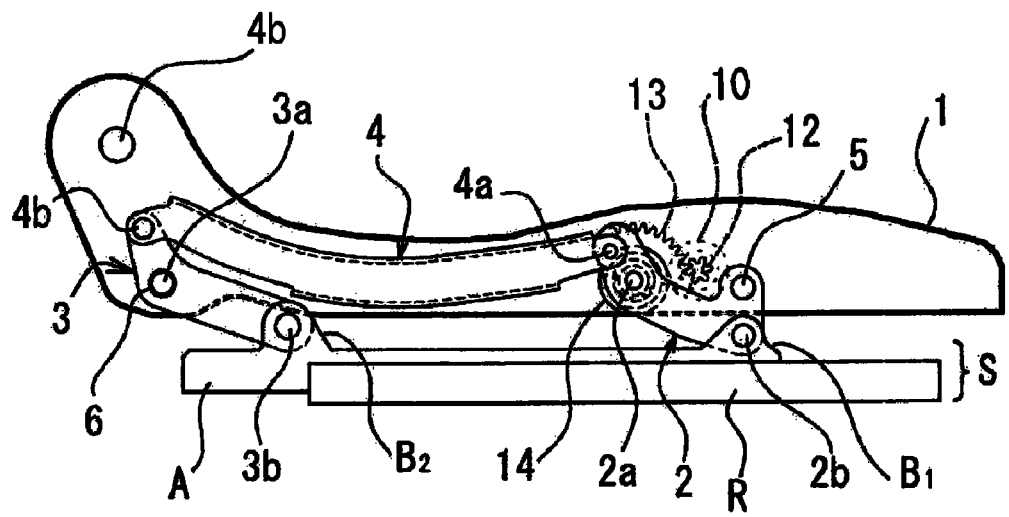
FIG. 1 is a schematic side view of a height adjusting device for an automobile seat according to an embodiment of the present invention.

A height adjusting device for an automobile seat according to an embodiment of the present invention will be discussed hereinafter with reference to the drawings. In the illustrated example, the height adjusting device is to be provided at an assistant seat which is employed in an automobile having a steering wheel on the right side of an automobile body. The automobile seat includes a frame for a seat cushion, the frame including a pair of spaced apart side frame sections, and a slide rail mechanism for allowing an entire seat to be moved in a forward/rearward direction in the automobile body, the slide rail mechanism including a pair of spaced apart lower rail members and a pair of spaced apart upper rail members slidably supported to said lower rail members so as to be slidable along the lower rail members. The height adjusting device includes an operation knob for operating an actuating mechanism of the height adjusting device. The operation knob is arranged outside one of the spaced apart side frame sections. In the drawings, only one of the spaced apart side frame sections, only one of the spaced apart lower rail members, and only one of the spaced apart upper rail members are shown. More particularly, a side frame section, a lower rail member, and an upper rail member which are arranged on the side at which the operation knob is not arranged are mainly omitted from the illustration, and a side frame section, a lower rail member, and an upper rail member which are arranged on the side at which the operation knob is arranged are mainly shown in the drawings. In the illustrated example, the operation knob is arranged outside a side of a forward portion of a left side frame section of the seat cushion frame.

Referring to FIG. 1, the height adjusting device is provided at the slide-type seat in which an entire seat comprising the seat cushion and a seat back can be moved in the forward/rearward direction along the spaced apart lower rail members R of the slide rail mechanism S which are installed on an automobile body floor. Each of the spaced apart upper rail members A is provided with spaced apart base brackets $B_1$, $B_2$ which are spaced apart from each other in a longitudinal direction of the upper rail member A and rise up from the upper rail member A.

The height adjusting device includes two pairs of forward and rearward linkage arms 2, 3, each of the forward linkage arms 2 being arranged between corresponding one of the side frame sections 1 and the forward base bracket $B_1$ of corresponding one of the upper rail members A, each of the rearward linkage arms 3 being arranged between corresponding one of the side frame sections 1 and the rearward base bracket $B_2$ of corresponding one of the upper rail members A, a linkage rod 4 connected between each of the forward linkage arms 2 and each of the rearward linkage arms 3, a first connection shaft 5 interconnecting the forward linkage arms 2, a second connection shaft 6 interconnecting the rearward linkage arms 3, and the actuating mechanism.

Each of the forward linkage arms 2 is supported at a substantially middle portion thereof to the corresponding side frame section 1 by a fixing pin 2*a*. Similarly, each of the rearward linkage arms 3 is supported at a substantially middle portion thereof to the corresponding side frame section 1 by a fixing pin 3*a*. Moreover, each of the forward linkage arms 2 is pivotally supported at a lower end portion thereof to a corresponding base bracket B$_1$ by a support pin 2*b* and each of the rearward linkage arms 3 is pivotally supported at a lower end portion thereof to a corresponding base bracket B$_2$ by a support pin 3*b*. The linkage rod 4 arranged on the side at which the operation knob is not arranged is connected at a forward end portion thereof to an upper end portion of a corresponding forward linkage arm 2 by a support pin 4*a* and connected a rearward end portion thereof to an upper end portion of a corresponding rearward linkage arm 3 by a support pin 4*b*. The linkage rod 4 arranged on the side at which the operation knob is arranged is connected at a forward end portion thereof to an upper end portion of a corresponding forward linkage arm 2 by a planting pin 16 (see FIG. 2) which will be discussed hereinafter, and connected at a rearward end portion thereof to an upper end portion of a corresponding rearward linkage arm 3 by a support pin 4*b*.

Figure 2:
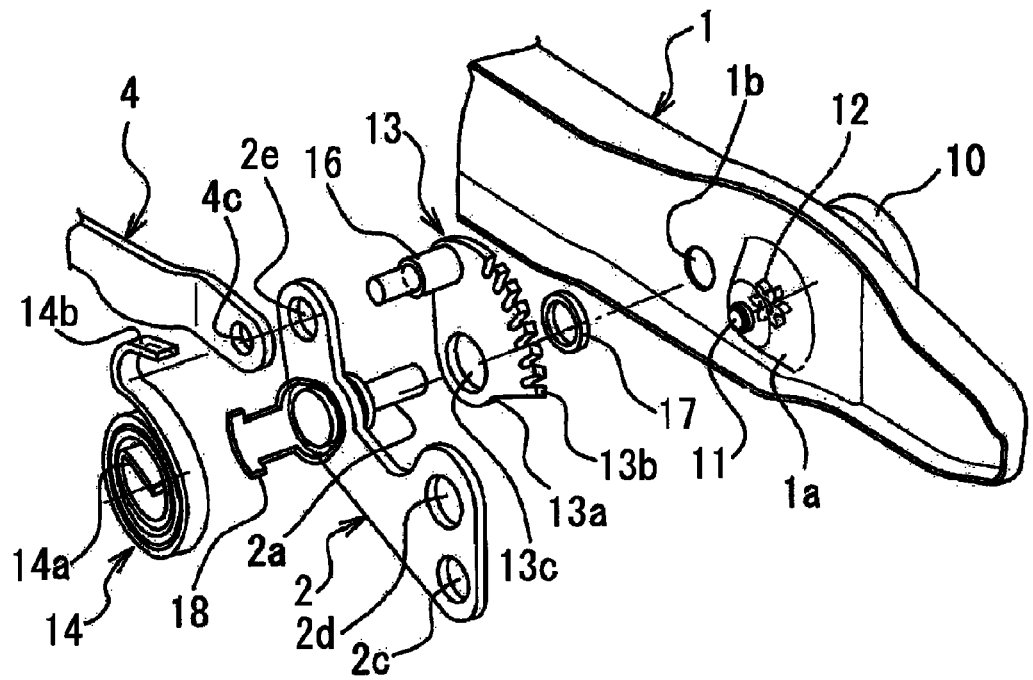
FIG. 2 is a schematic exploded perspective view of an actuating mechanism of the height adjusting device according to the embodiment of the present invention.
Figure 3:
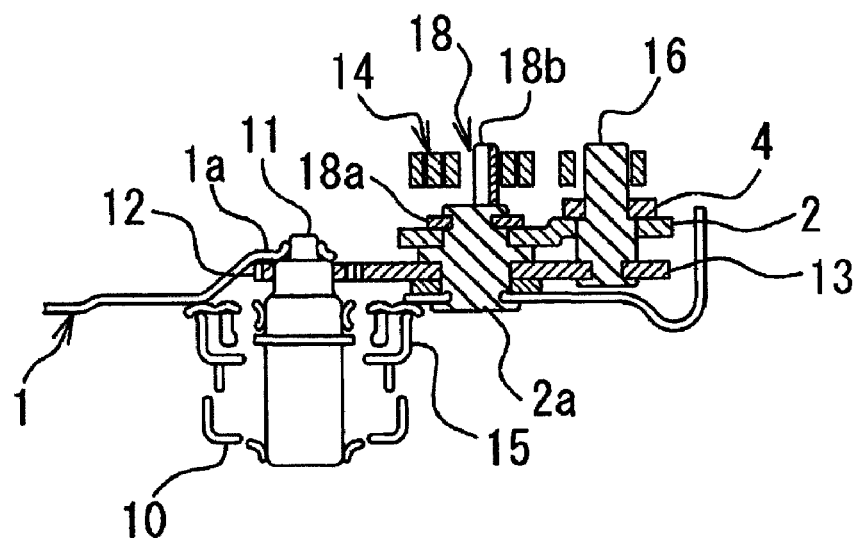
FIG. 3 is a schematic sectional view of the actuating mechanism of FIG. 2 in an assembled state.

Referring now to FIGS. 2 and 3, the actuating mechanism includes the operation knob 10 arranged outside the left side frame section 1 with a rotating shaft 11 thereof being rotatably penetrated the left side frame section 1, a pinion gear 12 mounted around the rotating shaft 11, a sector gear 13 meshed with the pinion gear 12, and a spiral spring 14 for directly pulling a linkage rod 4 which is arranged on the side at which the operating knob is arranged. A different spiral spring may be applied to the forward linkage arm and/or the rearward linkage arm which is arranged on the side at which the operation knob is not arranged.

As the operation knob 10, there may be employed a dial-type or lever-type operation knob. The left side frame section 1 at which the operation knob 10 is arranged includes a housing portion 1*a* which is formed by causing a portion of the left side frame section 1 to be embossed inward from a surface of the left side frame section 1 and has a substantially dome-shape in outline. The rotating shaft 11 of the operation knob 10 is rotatably penetrated through a top of the substantially dome-shaped housing portion 1*a* with the pinion gear 12 mounted around the rotating shaft 11 being received in the housing portion 1*a*. A brake section 15 is applied and fixed onto an outer surface of the left side frame section 1 so as to surround the rotating shaft 11. The substantially dome-shaped housing portion 1*a* is formed with a notch (not shown) through which the pinion gear 12 and the sector gear 13 arranged inside the left side frame section 1 are meshed with each other.

The sector gear 13 is arranged between the left side frame section 1 and the corresponding forward linkage arm 2 with a base portion 13*a* thereof being supported by the fixing pin 2*a* of the forward linkage arm 2. The planting pin 16 which has been briefly discussed above is protrusively provided on a corner portion of the sector gear 13 which is adjacent gear teeth 13*b* of the sector gear 13 and offset from the fixing pin 2*a*. The forward linkage arm 2 and the linkage rod 4 which are shown in FIG. 2 and arranged adjacent the first side frame section are connected to each other by the planting pin 16. The fixing pin 2*a* of the forward linkage arm 2 is fixed to the left side frame section 1 by riveting. Similarly, the planting pin 16 is fixed to the sector gear 13 by riveting.

In FIG. 2, a reference numeral 1*b* denotes a through-hole which is formed in the left side frame section 1 and through which the fixing pin 2*a* is inserted, a reference numeral 2*c* denotes a through-hole which is formed in the forward linkage arm 2 and through which the support pin 2*b* for interconnecting the lower end portion of the forward linkage arm 2 and the base bracket B$_1$ is inserted, a reference numeral 2*d* designates a fixing hole which is formed in the forward linkage arm 2 and in which an end of the first connection shaft 5 interconnecting the forward linkage arms 2 is inserted, a reference numeral 2*e* denotes a through-hole which is formed in the forward linkage arm 2 and through which the planting pin 16 of the sector gear 13 is inserted, a reference numeral 4*c* designates a through-hole which is formed in the linkage rod 4 and through which the planting pin 16 is inserted, a reference numeral 13*c* denotes a through-hole which is formed in the base portion of the sector gear 13 and through which the fixing pin 2*a* is inserted, and a reference numeral 17 denotes a spacer which is fitted on the fixing pin 2*a* and arranged between the left side frame section 1 and the sector gear 13.

Figure 4:
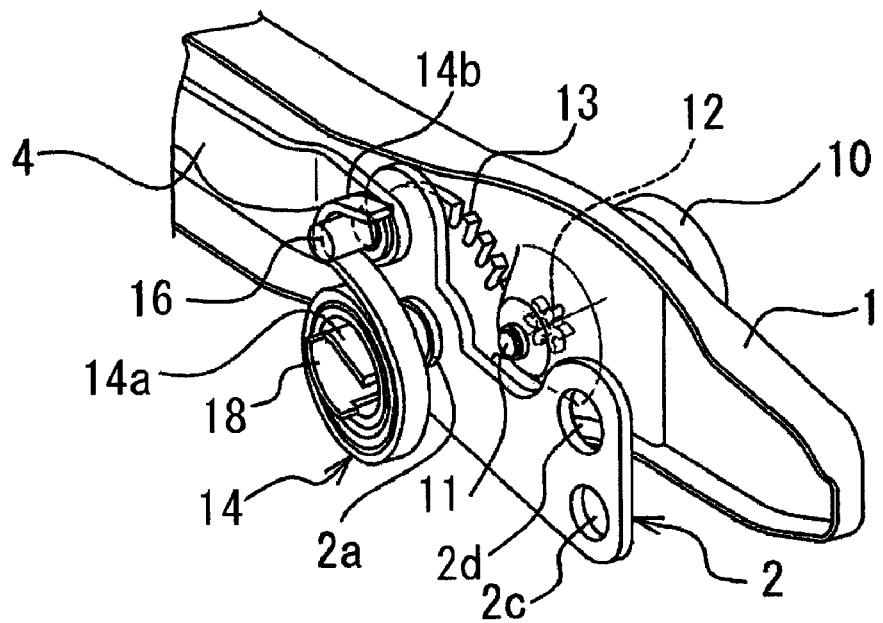
FIG. 4 is a schematic perspective view of the actuating mechanism of FIG. 2 in the assembled state.

Referring to FIG. 4, the spiral spring 14 is retained at an innermost end portion 14*a* thereof around the fixing pin 2*a* which is penetrated through the substantially middle portion of the forward linkage arm 2, and retained at an outermost end portion 14*b* thereof around the planting pin 16 which is penetrated through a connection portion between the forward linkage arm 2 and the linkage rod 4, so that the forward linkage arm 2 is biased in a rising-up direction by the spiral spring 14. The innermost end portion 14*a* of the spiral spring 14 may be retained to a spring-retaining member 18 which is protruded from an end of the fixing pin 2*a*. The outermost end portion 14*b* of the spiral spring 14 is retained to a small diameter axial-portion (see FIG. 2) of the planting pin 16.

Figure 5:
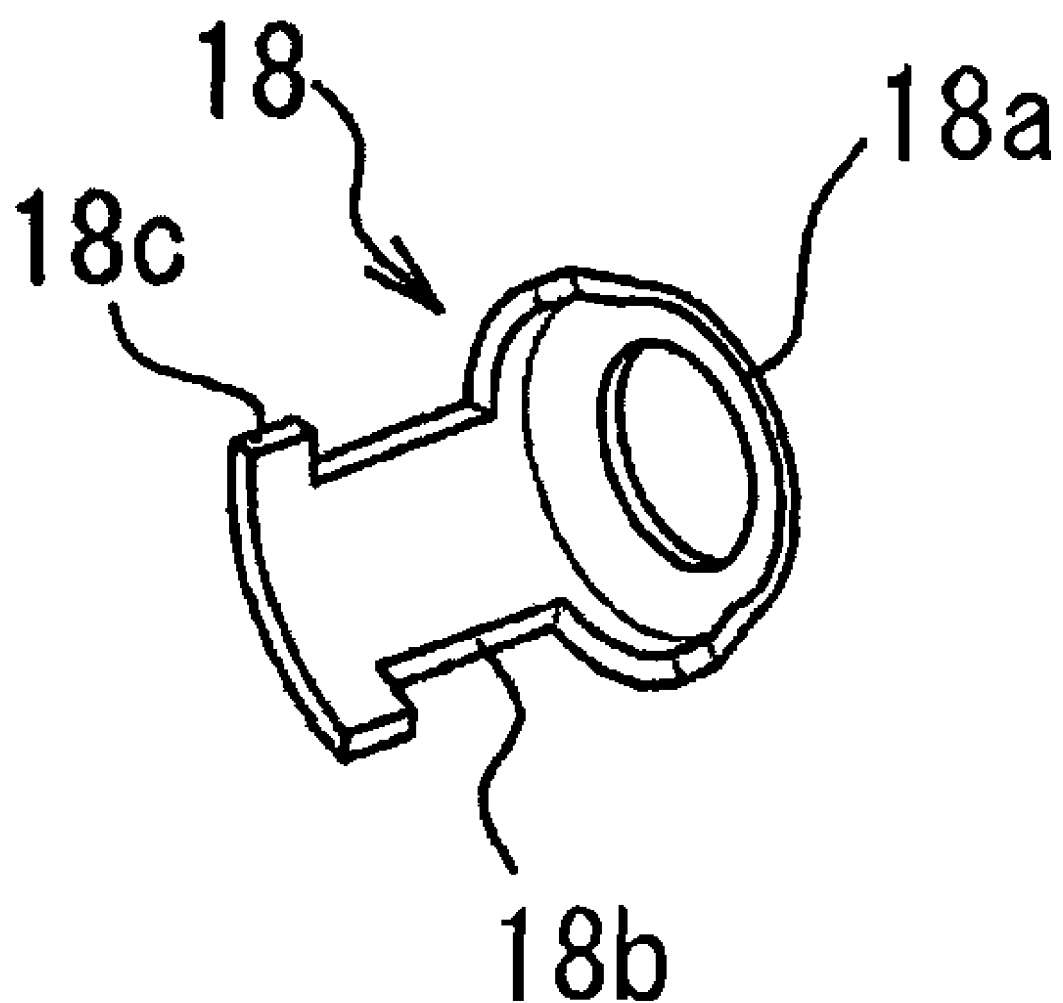
FIG. 5 is a schematic perspective view of a spring-retaining member employed in the actuating mechanism shown in FIG. 2.

Referring to FIG. 5, the spring-retaining member 18 includes a substantially cup-shaped base portion 18*a*, a narrow-width extension portion 18*b* of a substantially arc-shape in cross-section rising up from a region of a peripheral edge of the substantially cup-shaped base portion 18*a*, and a stopper portion 18*c* of a substantially arc-shaped in cross-section provided at an end of the narrow-width extension portion 18*b* and extending laterally with respect to the narrow-width extension portion 18*b*. The end of the fixing pin 2*a* is fitted through a through-hole formed in the substantially cup-shaped base portion 18*a* and secured to the base portion 18*a* by riveting. The innermost end portion 14*a* of the spiral spring 14 is retained around the narrow-width extension portion 18*b* and engaged with the laterally extending stopper portion 18*c* so as not to be unwound from the narrow-width extension portion 18*b*.

In the height adjusting device constructed as discussed above, when the operation knob 10 is rotated in a counter-clockwise direction in a case where the entire seat is located in a lower position, the pinion gear 12 is rotated in the same direction. Simultaneously with the rotation of the pinion gear 12, the sector gear 13 which is meshed with the pinion gear 12 is rotated in a clockwise direction. As the sector gear 13 is rotated, the planting pin 16 of the sector gear 13 which is arranged at a location which is offset from the fixing pin 2*a* is moved so as to cause the forward linkage arm 2 to be pivoted upward. Simultaneously, the linkage rod 4 which is connected to the forward linkage arm 2 is forward drawn and the rearward linkage arm 2 is also pivoted upward.

Synchronously with such movements of the forward linkage arm 2, the linkage rod 4, and the rearward linkage arm 3, the unshown forward linkage arm, the unshown linkage rod, and the unshown rearward linkage arm are moved in the same manners as the forward linkage arm 2, the linkage rod 4, and the rearward linkage arm 3 which are shown in FIG. 4 are done, respectively. Thus, the entire seat can be lifted up by the height adjusting device. When the operation knob is rotated in a clockwise direction, the forward linkage arms are pivoted so as to be collapsed, the linkage rods are drawn rearward, and the rearward linkage arms are also pivoted so as to be collapsed. In this way, the entire can be lowered by the height adjusting device.

In the illustrated embodiment, the fixing pin 2a of the forward linkage arm 2 which is shown in FIG. 2 is also used as a support pin for the sector gear 13, and the planting pin 16 of the sector gear 13 is used for a connection pin which interconnects the forward linkage arm 2 and the linkage rod 4, so that reduction of the number of parts of the height adjusting device, reduction of time to be required for assembling of the height adjusting device, and reduction of the assembling cost of the height adjusting device can be realized.

Moreover, the spiral spring 14 is retained at the innermost end portion 14a thereof to the spring-retaining member 18 attached to the end of the fixing pin 2a which is projected from the substantially middle portion of the forward linkage arm 2, and retained at the outermost end portion 14b thereof to the planting pin 16 which is penetrated through the connection portion between the forward linkage arm 2 and the linkage rod 4, so that after-attaching of the spiral spring 14 can be carried out. Thus, a peripheral structure around the sections to which the spiral spring 14 is applied can be simplified, and replacement of the spiral spring can be easily carried out.

In the illustrated example, the innermost end portion 14a of the spiral spring 14 is retained around the narrow-width extension portion 18b of the spring-retaining member 18 and the outermost end portion 14b of the spiral spring 14 is retained around the planting pin 16, so that even if there is a limitation on an offset amount between the fixing pin 2a and the planting pin 16, the spiral spring of a large spring constant can be employed. Therefore, by causing the operation knob to be rotated with small power, the seat can be vertically moved, thus making it possible to improve operability of the height adjusting device.

While the case where the actuating mechanism is arranged at the forward portion of the side frame section has been discussed above in connection with the embodiment of the present invention, the actuating mechanism may be arranged at a rearward portion of the side frame section.

The terms and expressions which have been employed are used as terms of description and not of limitation, and there is no intention in the use of such terms and expressions of excluding any equivalents of the features shown and described, or portions thereof, but it is recognized that various modifications are possible within the scope of the invention claimed.

The invention claimed is:

1. A height adjusting device for an automobile seat, said automobile seat including a seat cushion frame having a pair of first and second spaced apart side frame sections, and first and second pairs of spaced apart base brackets, said height adjusting device comprising:

a pair of first and second forward linkage arms;

said first forward linkage arm being bridged between said first side frame section and corresponding one of said first pair of spaced apart brackets and supported at a substantially middle portion thereof to said first side frame section by a fixing pin;

said second forward linkage arm being bridged between said second side frame section and the other of said first pair of spaced apart brackets and supported at a substantially middle portion thereof to said second side frame section;

a pair of first and second rearward linkage arms;

said first rearward linkage arm being bridged between said first side frame section and corresponding one of said second pair of spaced apart brackets and supported at a substantially middle portion thereof to said first side frame section;

said second rearward linkage arm being bridged between said second side frame section and the other of said second pair of spaced apart brackets and supported at a substantially middle portion thereof to said second side frame section;

a first linkage rod connected at a forward end and a rearward end thereof to an upper end of said first forward linkage arm and an upper end of said first rearward linkage arm;

a second linkage rod connected at a forward end and a rearward end thereof to an upper end of said second forward linkage arm and an upper end of said second rearward linkage arm;

a first connection shaft interconnecting said forward linkage arms;

a second connection shaft interconnecting said rearward linkage arms; and an actuating mechanism for causing said forward and rearward linkage arms to be vertically pivoted;

said actuating mechanism including:

an operation knob having a rotating shaft;

said operation knob being arranged outside said first side frame section with said rotating shaft being rotatably penetrated through said first side frame section;

a pinion gear mounted around said rotating shaft;

a sector gear for directly drawing said first linkage rod;

said sector gear being arranged inside said first side frame section and meshed with said pinion gear; and a spiral spring for directly biasing said first forward linkage arm in a rising-up direction;

said sector gear being arranged between said first side frame section and said first forward linkage arm and supported at a base portion thereof to said fixing pin of said first forward linkage arm;

said sector gear having a planting pin provided at a corner portion thereof adjacent gear teeth thereof so as to be projected from said sector gear;

said first forward linkage arm and said first linkage rod being connected to each other by said fixing pin; and said spiral spring being stretched between said fixing pin and said planting pin with an innermost end portion thereof being retained around an end of said fixing pin which is projected inward from said first forward linkage arm, and with an outermost end portion thereof being retained around an end of said planting pin which is projected inward from a connection portion between said first forward linkage arm and said first linkage rod.

2. A height adjusting device according to claim 1, wherein said spiral spring has a large spring constant, and said fixing pin is provided at said end thereof with a spring-retaining member, said innermost end portion of said spiral spring being retained to said spring-retaining member.

* * * * *